W. L. REID.
LATHE DOG.
APPLICATION FILED JUNE 19, 1909.
955,688.
Patented Apr. 19, 1910.
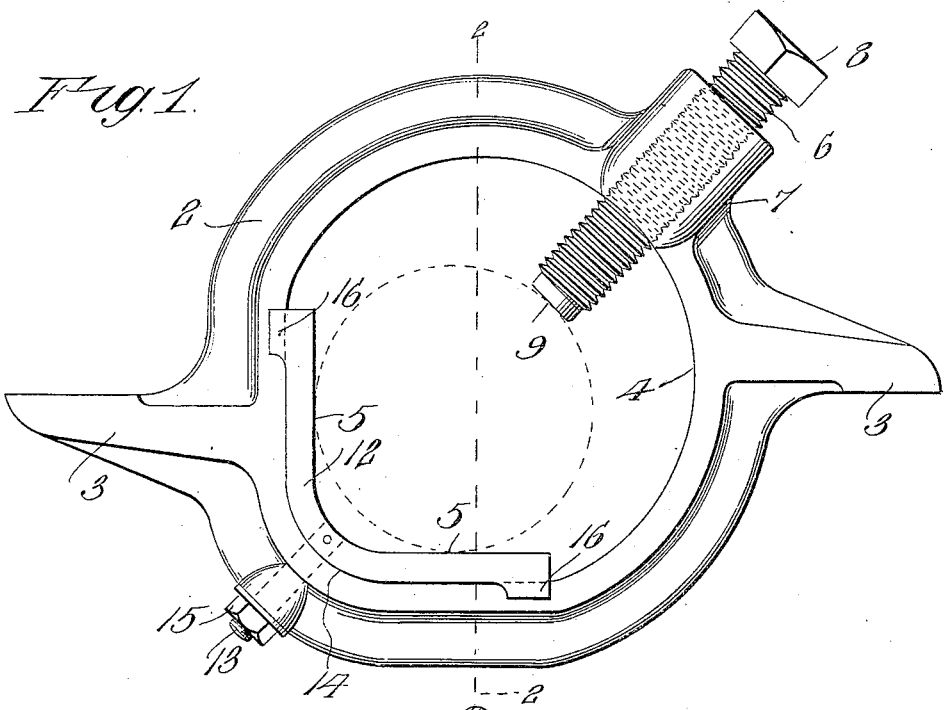
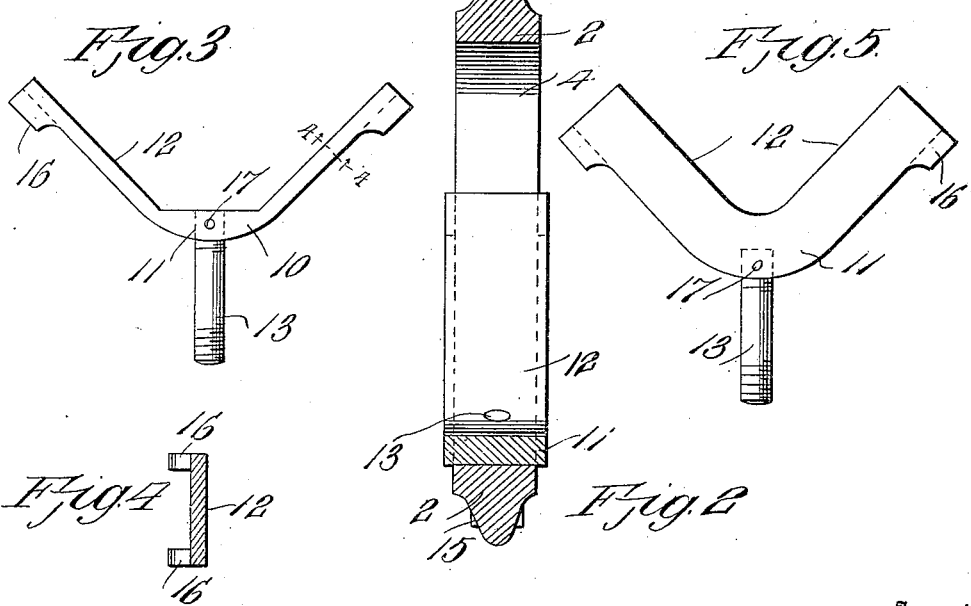
Witnesses
Frank Hough
John F. Byrne
Inventor
William L. Reid,
By Victor J. Evans
Attorney

UNITED STATES PATENT OFFICE.

WILLIAM L. REID, OF SCHENECTADY, NEW YORK.

LATHE-DOG.

955,688.  Specification of Letters Patent.  Patented Apr. 19, 1910.

Application filed June 19, 1909. Serial No. 503,135.

*To all whom it may concern:*

Be it known that I, WILLIAM L. REID, a citizen of the United States, residing at Schenectady, in the county of Schenectady and State of New York, have invented new and useful Improvements in Lathe-Dogs, of which the following is a specification.

My invention relates to lathe dogs, and its primary object is to provide a device of this character embodying a construction which obviates the necessity of the use of sharp jaws for clamping the work in the dog.

A further object of my invention is the provision of a lathe dog having an angular seat for the reception of the work and a single clamping bolt, the clamping bolt being arranged in a plane extending through the apex of the seat, and the angular formation of the seat automatically centering the work with relation to the clamping bolt and reducing the contact between the dog and the work to the minimum.

A further and important object of my invention is the provision of a lathe dog which may be readily and quickly adapted for the reception of work of various sizes.

Another object of my invention is the provision of a lathe dog which is simple, durable and efficient, and which can be manufactured and sold at a comparatively low cost.

With the above and other objects in view, the invention consists in the construction, combination and arrangement of parts herinafter fully described, claimed and illustrated in the accompanying drawing, wherein:

Figure 1 is a view in side elevation of a lathe dog constructed in accordance with my invention. Fig. 2 is a sectional view taken on a plane indicated by the line 2—2 of Fig. 1. Fig. 3 is a detail view of a filler by means of which the dog can be adapted for the reception of work of various sizes. Fig. 4 is a sectional view taken on a plane indicated by the line 4—4 of Fig. 3, looking in the direction indicated by the arrows, and Fig. 5 is a detail view of a filler of a size larger than the filler disclosed in Fig. 3.

Similar reference numerals indicate the same parts in the several figures of the drawing.

The body of the lathe dog comprises a substantially annular member 2 which is of the usual form in cross-section, and diametrically opposed arms 3 which project laterally from the member in opposite directions. The arms 3 provide means by which the lathe dog can be secured in applied position. The member 2 is provided with a curved wall 4 and straight walls 5. The walls 5 are arranged at an angle with relation to each other to provide an angular seat for the work. As the work seat is angular the contact between the seat and the work is reduced to the minimum and the work is automatically centered with relation to a single clamping bolt 6 which is adapted to bear at its inner end on the work at a point centrally between the points of contact between the work and the seat. A boss 7 is formed upon the member 2 and is provided with an opening which is disposed in a plane extending through a point centrally between the ends of the work seat. The wall of the opening of the boss 7 is threaded for the reception of the clamping bolt 6, which is provided with an angular head 8 to permit its adjustment by means of a tool. The inner end 9 of the bolt 6 is plain so as to reduce the surface of the contact between itself and the work to a minimum.

If the bolt, after being moved to the limit of its upward adjustment, will not contact with the work, a filler plate 10 is mounted on the work seat. The fillers may be of any thickness to reduce the distance between the inner end 9 of the clamping bolt 6 and the work seat, whereby the lathe is adapted for use on work of various sizes. The filler 10 comprises a head 11, arms 12 and an attaching member 13. The arms 12 are arranged at an angle with relation to each other and the relatively inner surfaces thereof and of the head 11 conform to the configuration of the work seat. The attaching member 13 is adapted to be inserted through an opening 14 in the member 2. The attaching member 13 projects beyond the member 2 and is threaded for the reception of a nut 15 which secures the filler in applied position. To prevent the filler from having any movement on the work seat, flanges 16 are formed on the arms 12 for engagement with the opposite sides of the member 2. The attaching member 13 is threaded into a socket formed in the head 11 of the filler and secured against displacement by means of a pin 17, which passes through the head of the filler and the attaching member.

It should be apparent from the above description taken in connection with the accompanying drawing, that, owing to the angular formation of the work seat and the relation of the clamping bolt thereto, the work will be automatically centered with relation to the clamping bolt, and that the work will only be contacted with at three points. It should also be apparent that the use of the fillers adapts the dog for use in connection with work of various sizes, thus greatly reducing the number of dogs required. As the work is contacted with at three points, all liability of its slipping in the dog is obviated.

Having fully described and illustrated my invention, what I claim is:

A lathe dog comprising a substantially annular member, the inner wall of the member being formed to provide an angular work seat, laterally projecting arms formed on the member at diametrically opposite points, a boss formed on the member and provided with a threaded opening extending therethrough and through the member, a threaded clamping bolt mounted in said opening, a filler adapted to be mounted upon the work seat, said filler consisting of a head and arms extending from the head, said head being provided with a threaded socket, an attaching member having threaded ends, one end of the attaching member being threaded into the socket of said head, said attaching member passing through the annular member, a nut mounted upon the other threaded end of the attaching member, and flanges formed on the outer ends of the arms of the filler for engagement with the sides of the annular member, said arms and attaching member preventing the filler from movement on the work seat.

In testimony whereof I affix my signature in presence of two witnesses.

WILLIAM L. REID.

Witnesses:
   W. S. FRAME,
   A. A. MATHER.